US011293824B2

(12) United States Patent
Kawase et al.

(10) Patent No.: US 11,293,824 B2
(45) Date of Patent: Apr. 5, 2022

(54) SENSOR ASSEMBLY AND PHYSICAL QUANTITY MEASURING DEVICE

(71) Applicant: NAGANO KEIKI CO., LTD., Tokyo (JP)

(72) Inventors: Nobuaki Kawase, Tokyo (JP); Toshinori Suzuki, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 248 days.

(21) Appl. No.: 16/691,769

(22) Filed: Nov. 22, 2019

(65) Prior Publication Data

US 2020/0166425 A1     May 28, 2020

(30) Foreign Application Priority Data

Nov. 28, 2018   (JP) .............................. JP2018-222336

(51) Int. Cl.
*G01K 11/30*     (2006.01)
*G01L 19/00*     (2006.01)
(Continued)

(52) U.S. Cl.
CPC ............ *G01L 19/0092* (2013.01); *G01K 7/18* (2013.01); *G01K 15/005* (2013.01);
(Continued)

(58) Field of Classification Search
CPC . G01L 19/0092; G01L 19/0084; G01L 19/14; G01L 19/143; G01L 9/045;
(Continued)

(56) References Cited

U.S. PATENT DOCUMENTS 4,141,252 A    2/1979  Lodge
4,835,717 A *  5/1989  Michel ................ G01L 19/0092
                                                    702/51
(Continued)

FOREIGN PATENT DOCUMENTS

CN    107782352 A  *  3/2018  ........... G01L 19/148
CN     11595384 A  *  8/2020
(Continued)

OTHER PUBLICATIONS

European Search Report dated Mar. 31, 2020, 11 pages.
Japanese Office Action with English translation dated Jul. 27, 2021, 8 pages.

*Primary Examiner* — Gail Kaplan Verbitsky
(74) *Attorney, Agent, or Firm* — Rankin, Hill & Clark LLP

(57) ABSTRACT

A sensor assembly includes: a sensor module including a cylindrical portion into which a measurement target fluid is introduced and a diaphragm including a first surface in contact with the measurement target fluid and a second surface provided with a detector; a joint provided with a pressure introduction port for introducing the measurement target fluid to the sensor module; a cylindrical base member surrounding the sensor module; an electronic circuit attached to the base member to receive a detection signal outputted by the detector; and a temperature sensor electrically connected with the electronic circuit. The temperature sensor includes a temperature detector for detecting temperature, and a lead wire electrically connecting the temperature detector and the electronic circuit. The base member is provided with a receiver for receiving the temperature detector and the lead wire.

5 Claims, 6 Drawing Sheets

(51) Int. Cl.
*G01K 7/18* (2006.01)
*G01K 15/00* (2006.01)
*G01K 1/14* (2021.01)
*G01K 1/08* (2021.01)

(52) U.S. Cl.
CPC .............. *G01K 15/007* (2013.01); *G01K 1/08* (2013.01); *G01K 1/14* (2013.01); *G01K 11/30* (2013.01)

(58) Field of Classification Search
CPC ........ G01L 19/147; G01K 13/02; G01K 1/14; G01K 13/024; G01K 13/026; G01K 7/18; G01K 15/005; G01K 15/007; G01K 1/08; G01D 11/245; G01D 11/30
USPC ................ 374/141, 143, 147, 148, 163, 208
See application file for complete search history.

(56) References Cited

U.S. PATENT DOCUMENTS

| | | | | |
|---|---|---|---|---|
| 6,915,686 | B2* | 7/2005 | Baustad | E21B 47/06 73/152.46 |
| 7,043,993 | B2* | 5/2006 | Hayashi | G01L 19/02 73/708 |
| 7,434,470 | B2* | 10/2008 | Engelhardt | G01D 11/245 374/E13.006 |
| 9,631,991 | B2 | 4/2017 | Tobyama et al. | |
| 10,288,513 | B2* | 5/2019 | Bae | G01L 19/0084 |
| 2004/0035634 | A1* | 2/2004 | Rueter | G01V 1/184 181/122 |
| 2005/0103110 | A1* | 5/2005 | Ernsberger | G01L 19/148 73/708 |
| 2007/0237205 | A1* | 10/2007 | Hayashi | G01L 19/0092 374/163 |
| 2008/0072877 | A1* | 3/2008 | Kurtz | G01L 19/0092 123/406.55 |
| 2009/0041081 | A1* | 2/2009 | Warth | G01L 9/0055 374/143 |
| 2009/0080492 | A1* | 3/2009 | Takeuchi | G01K 1/14 374/144 |
| 2010/0284437 | A1* | 11/2010 | Stoll | G01K 13/02 374/143 |
| 2015/0007650 | A1* | 1/2015 | Rose | E21B 47/06 73/152.51 |
| 2016/0025580 | A1* | 1/2016 | Ooya | G01L 9/008 73/702 |
| 2017/0153157 | A1* | 6/2017 | Abe | G01L 9/0051 |
| 2018/0223242 | A1* | 8/2018 | Fadell | C12M 41/40 |

FOREIGN PATENT DOCUMENTS

| | | | | |
|---|---|---|---|---|
| DE | 102018123433 | A1 * | 3/2020 | .......... G01L 19/0092 |
| DE | 102019208361 | A1 * | 12/2020 | ............ G01D 11/30 |
| DE | 102019216810 | A1 * | 5/2021 | .......... G01L 19/003 |
| EP | 1 096 241 | A1 | 5/2001 | |
| JP | H11-002577 | A | 1/1999 | |
| JP | 2004-279371 | | 10/2004 | |
| JP | 2006-194683 | | 7/2006 | |
| JP | 2008-064732 | A | 3/2008 | |
| JP | 2009-281915 | | 12/2009 | |
| JP | 2012-242208 | | 12/2012 | |
| JP | 2013-015476 | A | 1/2013 | |

* cited by examiner

SENSOR ASSEMBLY AND PHYSICAL QUANTITY MEASURING DEVICE

The entire disclosure of Japanese Patent Application No. 2018-222336 filed Nov. 28, 2018 is expressly incorporated by reference herein.

TECHNICAL FIELD

The present invention relates to a sensor assembly and a physical quantity measuring device.

BACKGROUND ART

Some of known pressure measurement devices include a built-in temperature sensor (see, for instance, Patent Literature 1 (JP 2004-279371 A), Patent Literature 2 (JP 2006-194683 A), Patent Literature 3 (JP 2009-281915 A), and Patent Literature 4 (JP 2012-242208 A)).

The temperature sensor of the pressure measurement devices disclosed in Patent Literatures 1 to 4 is attached to a pressure introduction port provided in a housing for introducing pressure to a pressure detector. The temperature of measurement target fluid introduced to the pressure detector can be thus accurately measured.

It should be noted that temperature calibration is sometimes performed in a pressure measurement device in order to compensate for variations in measurements depending on temperature. At this time, a temperature sensor may be attached to a circuit board for processing detection signals outputted from the pressure detector to perform the temperature calibration based on a temperature measured by the temperature sensor.

In this case, since the pressure detector (e.g. a strain gauge) provided on a diaphragm is spaced apart from the circuit board, the temperature sensor attached to the circuit board cannot measure an accurate temperature of a pressure detection unit, so that it is difficult to perform appropriate temperature calibration.

In view of the above, it may be possible to perform temperature calibration using the temperature of the measurement target fluid measured by the temperature sensor based on the disclosures of the pressure measurement devices in Patent Literatures 1 to 4.

However, when, for instance, the temperature of the measurement target fluid is high, the temperature sensor is exposed to the high-temperature measurement target fluid, while the pressure detector, which is disposed on a side of the diaphragm not exposed to the measurement target fluid, thus receives heat transferred from the measurement target fluid, but is cooled by ambient air, thereby sometimes resulting in difference in temperature between the pressure detector and the neighborhood of the temperature sensor. Accordingly, the pressure measurement devices according to Patent Literatures 1 to 4 cannot accurately measure the temperature of the pressure detector by the temperature sensor, sometimes failing to perform appropriate temperature calibration.

SUMMARY OF THE INVENTION

An object of the invention is to provide a sensor assembly and a physical quantity measuring device capable of appropriately calibrating temperature.

A sensor assembly according to an aspect of the invention includes: a sensor module including: a cylindrical portion, in which a measurement target fluid is introducible; and a diaphragm provided at an end of the cylindrical portion, the diaphragm including a first surface to be in contact with the measurement target fluid, and a second surface opposite the first surface, a detector being provided on the second surface; a joint attached with the sensor module, the joint including a pressure introduction port configured to introduce the measurement target fluid to the sensor module; a cylindrical base member attached to the joint, the cylindrical base member surrounding the sensor module; an electronic circuit attached to the base member and configured to receive a detection signal outputted by the detector; and a temperature sensor electrically connected with the electronic circuit, in which the temperature sensor includes a temperature detector configured to detect a temperature, and at least one lead wire electrically connecting the temperature detector and the electronic circuit, and the base member is provided with a receiver configured to receive the temperature detector and the lead wire.

In the above aspect of the invention, the temperature detector of the temperature sensor is received in the receiver of the cylindrical base member surrounding the sensor module provided with the detector. Accordingly, the temperature detector can be provided at the side of the sensor module opposite the side receiving the measurement target fluid (i.e. the side provided with the detector) and near the sensor module. Thus, even when, for instance, the temperature of the measurement target fluid is high, the temperature detector, which is cooled by ambient air in the same manner as the detector, can accurately measure the temperature of the detector. Therefore, appropriate temperature calibration can be performed on the pressure of the measurement target fluid detected by the detector.

Further, since the temperature detector and the lead wire can be received in the receiver of the base member, it is not necessary to provide in the joint the receiver for receiving the temperature detector and the lead wire, so that the production process for the joint can be facilitated. It should be noted that, when the base member is made of, for instance, a resin material, the receiver for receiving the temperature detector and the lead wire can be easily formed.

In the sensor assembly according to the above aspect of the invention, it is preferable that the base member includes a positioning projection on an inner circumferential side thereof, and the joint includes a positioning recess engageable with the positioning projection at a position corresponding to the positioning projection.

In the above arrangement, when the base member is assembled with the joint, the positioning recess of the joint is engaged with the positioning projection of the base member, thereby determining the position of the base member with respect to the joint. Accordingly, no positioning device or the like is necessary in assembling the base member and the joint, thereby facilitating the production of the sensor assembly.

In the sensor assembly according to the above aspect of the invention, it is preferable that the receiver includes: a groove formed on an outer circumferential side of the base member and configured to receive the lead wire; a receiver recess formed on an inner circumferential side of the base member and configured to receive the temperature detector; and a communication hole for bringing the groove in communication with the receiver recess, and the receiver recess is formed on the positioning projection.

In the above arrangement, the receiver recess for receiving the temperature detector is provided on the inner circumferential side of the base member. Accordingly, the temperature detector can be provided near the sensor module. The accurate temperature of the sensor module can thus be measured. Further, since the receiver recess is provided on the positioning projection, it is not necessary to separately form the positioning projection and the receiver recess, thus facilitating the production of the base member.

In the sensor assembly according to the above aspect of the invention, it is preferable that the at least one lead wire includes a first lead wire and a second lead wire, and the groove includes a projected guide between the first lead wire and the second lead wire.

In the above arrangement, the first lead wire and the second lead wire are mutually oppositely disposed across the projected guide, preventing the short circuit between the first lead wire and the second lead wire. Accordingly, no insulating treatment (e.g. coating) is necessary for these wires, thereby facilitating the production of the sensor assembly.

A physical quantity measuring device according to another aspect of the invention includes: the sensor assembly according to the above aspect of the invention; a cylindrical case attached with the sensor assembly; and a signal transmitting member electrically connected with the electronic circuit.

The same advantages as described above can be obtained by the above aspect of the invention.

Further, in the above aspect of the invention, the sensor assembly by itself includes the sensor module, the electronic circuit and the temperature sensor. Accordingly, the temperature calibration and the temperature characteristics of the sensor module can be checked before the sensor assembly is installed in the physical quantity measuring device. Thus, the sensor assembly can be stored after the temperature calibration and temperature characteristics of the sensor module are checked, thereby enhancing the production efficiency of the physical quantity measuring device.

BRIEF DESCRIPTION OF THE DRAWING(S)

DESCRIPTION OF EMBODIMENT(S)

An exemplary embodiment of the invention will be described with reference to the attached drawings.

Figure 1:
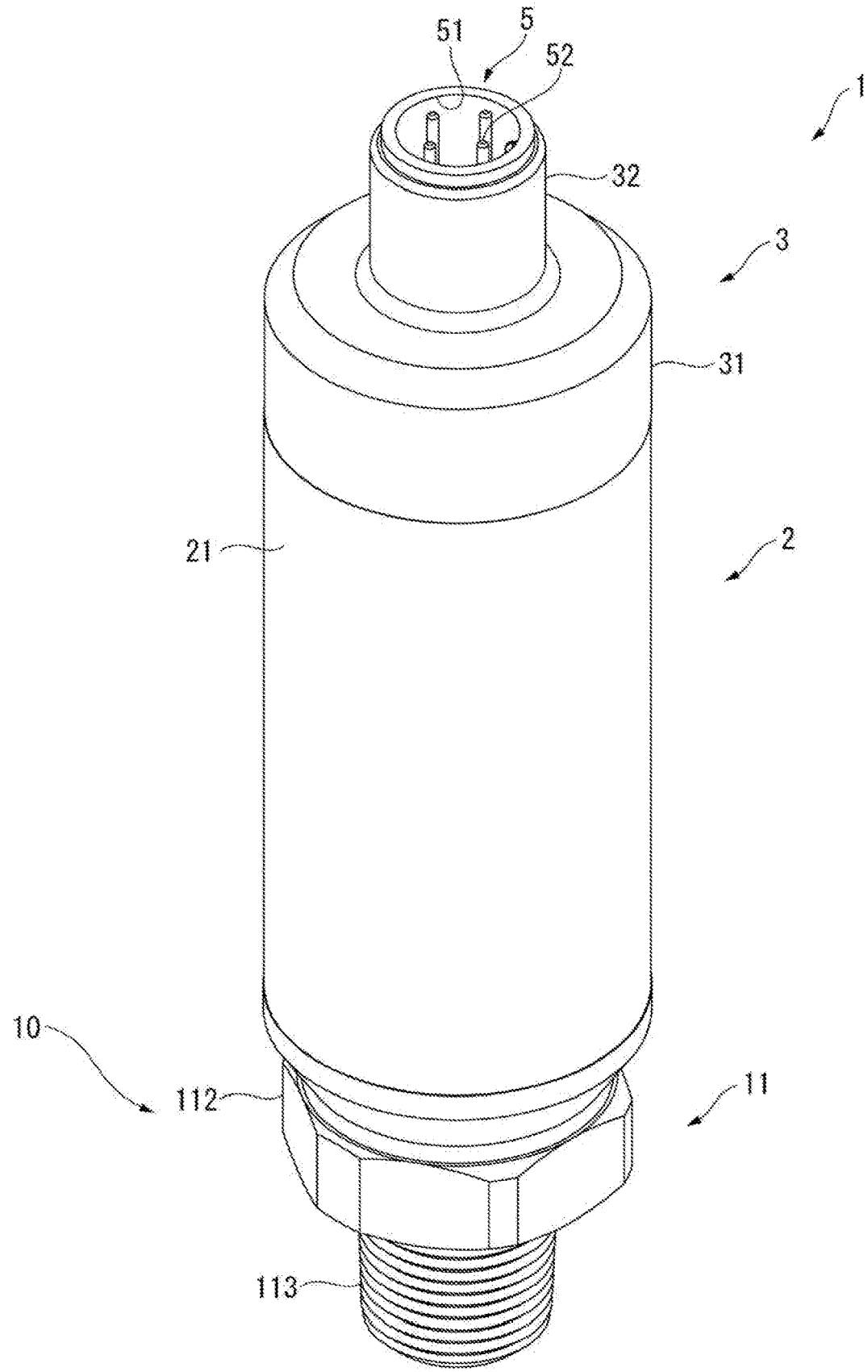
FIG. 1 is a perspective view showing an overall structure of a physical quantity measuring device according to an exemplary embodiment of the invention.
Figure 2:
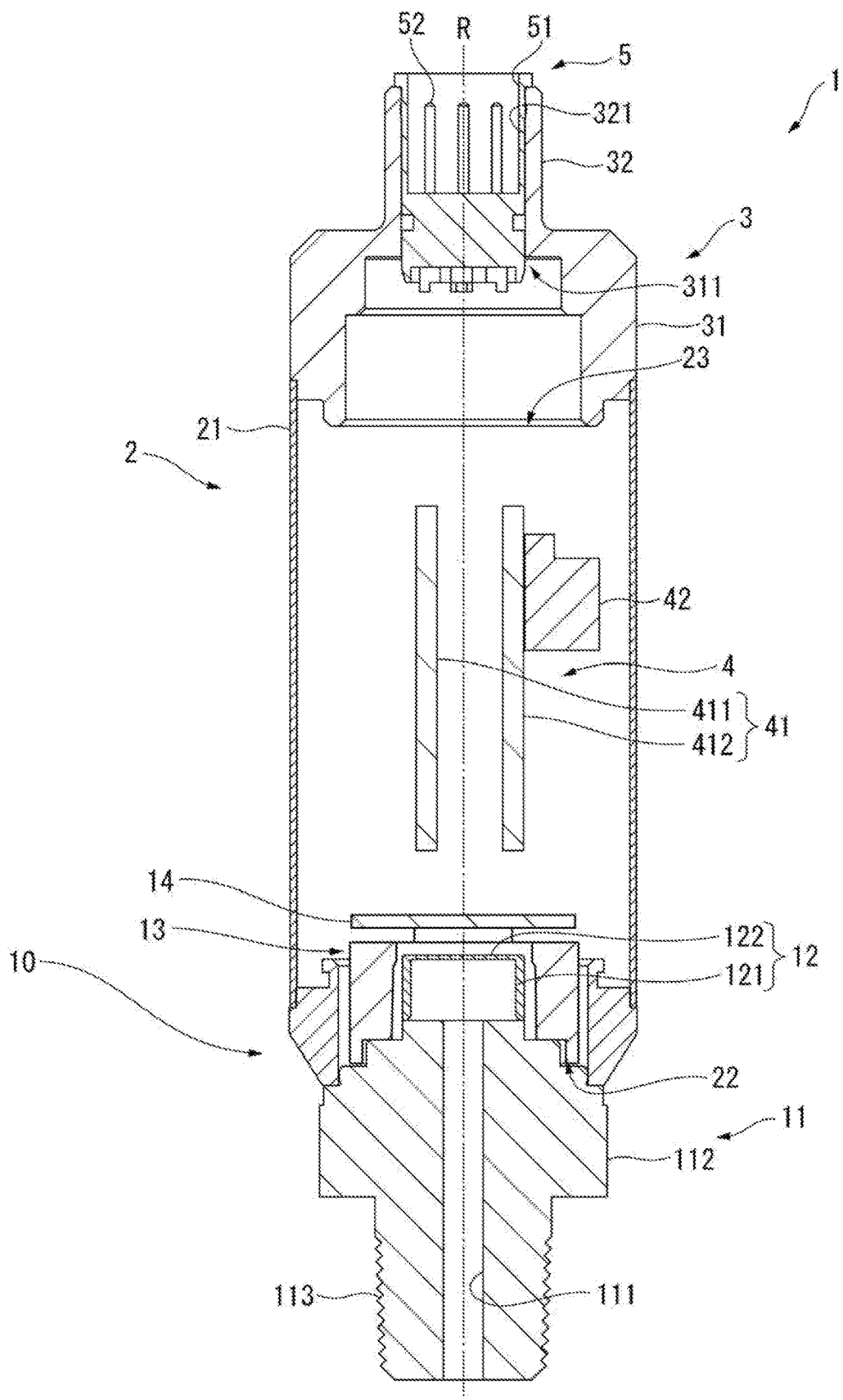
FIG. 2 is a cross-sectional view showing the overall structure of the physical quantity measuring device according to the exemplary embodiment.

FIG. 1 is a perspective view showing an overall structure of a physical quantity measuring device 1 according to the exemplary embodiment. FIG. 2 is a cross-sectional view showing the overall structure of the physical quantity measuring device 1.

As shown in FIGS. 1 and 2, the physical quantity measuring device 1 includes a cylindrical case 2, a cap 3, a circuit board 4, a signal transmitting member 5, and a sensor assembly 10.

Cylindrical Case

The cylindrical case 2, which is a metallic component in a form of a hollow circular cylinder, includes a circumferential portion 21, and a first opening 22 and a second opening 23 that are defined on a first end and a second end of the cylindrical case 2, respectively, along a center axis R of the cylindrical case 2. It should be noted that the cylindrical case 2 is not necessarily in a form of a circular cylinder, but may be in a form of a polygonal cylinder (e.g. quadrangular cylinder and hexagonal cylinder).

Cap

The cap 3, which is a metallic component of a so-called connector type, includes a cap body 31 and a cylindrical portion 32. The cap body 31, which is in a form of a bottomed cylinder, is welded at an open end thereof to the second opening 23 of the cylindrical case 2. It should be noted that the cap body 31 is not necessarily welded to the cylindrical case 2 but may, for instance, be threaded into the cylindrical case 2.

A communicating portion 311 in communication with the cylindrical portion 32 is provided to the bottom of the cap body 31. An inner circumferential surface of the cylindrical portion 32 defines an attachment hole 321, in which the signal transmitting member 5 is housed.

The cap 3 is not necessarily arranged as described above, but may be, for instance, a terminal box type component in which a terminal block is provided, or a component capable of wireless output.

Circuit Board

The circuit board 4 includes: a board body 41; and an electronic component 42 provided on the board body 41.

The board body 41, which is a rectangular plate in a plan view whose direction along the center axis R of the cylindrical case 2 is defined as a longitudinal direction, has a wiring pattern and the like (not shown) on a front surface.

In the exemplary embodiment, the board body 41 includes a first board 411 and a second board 412 that are disposed in parallel to each other. The first board 411 and the second board 412 are held by a holder (not shown). The board body 41 is not necessarily arranged as described above. For instance, the board body 41 may be provided by a single board or three or more boards.

The electronic component 42, which is configured to receive a detection signal from the sensor assembly 10, is provided on the second board 412. The electronic component 42 is electrically connected to a later-described electronic circuit 14 of the sensor assembly 10 with a wire and the like (not shown).

Signal Transmitting Member

The signal transmitting member 5 includes a cylindrical member 51 and a terminal 52.

The cylindrical member 51 is disposed on an inner circumferential side of the cylindrical portion 32 of the cap 3.

The terminal 52 includes a plurality of terminals provided inside the cylindrical member 51. In the exemplary embodiment, four terminals 52 are provided. The terminal 52 is not necessarily arranged as described above. For instance, the terminal 52 may include a single terminal or five or more terminals.

The terminal 52 is electrically connected to the electronic component 42 of the circuit board 4 through a wire and the like (not shown). Thus, the terminal 52 is electrically connected with the later-described electronic circuit 14 of the sensor assembly 10 via the electronic component 42.

It should be noted that the cylindrical member 51 is not necessarily in a form of a circular cylinder, but may be in a form of a polygonal cylinder (e.g. quadrangular cylinder and hexagonal cylinder).

Sensor Assembly

Figure 3:
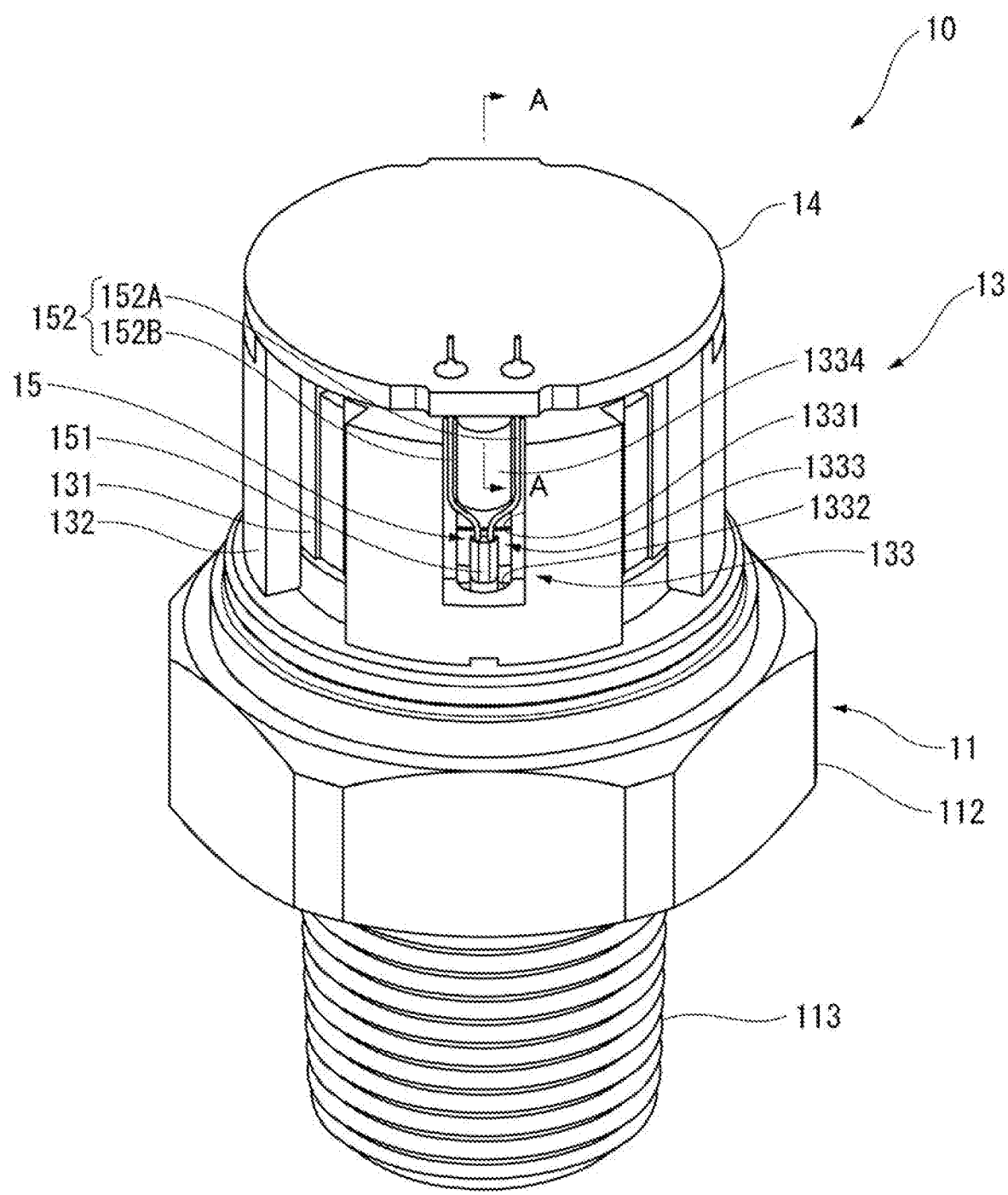
FIG. 3 is a perspective view showing an overall structure of a sensor assembly according to the exemplary embodiment.
Figure 4:
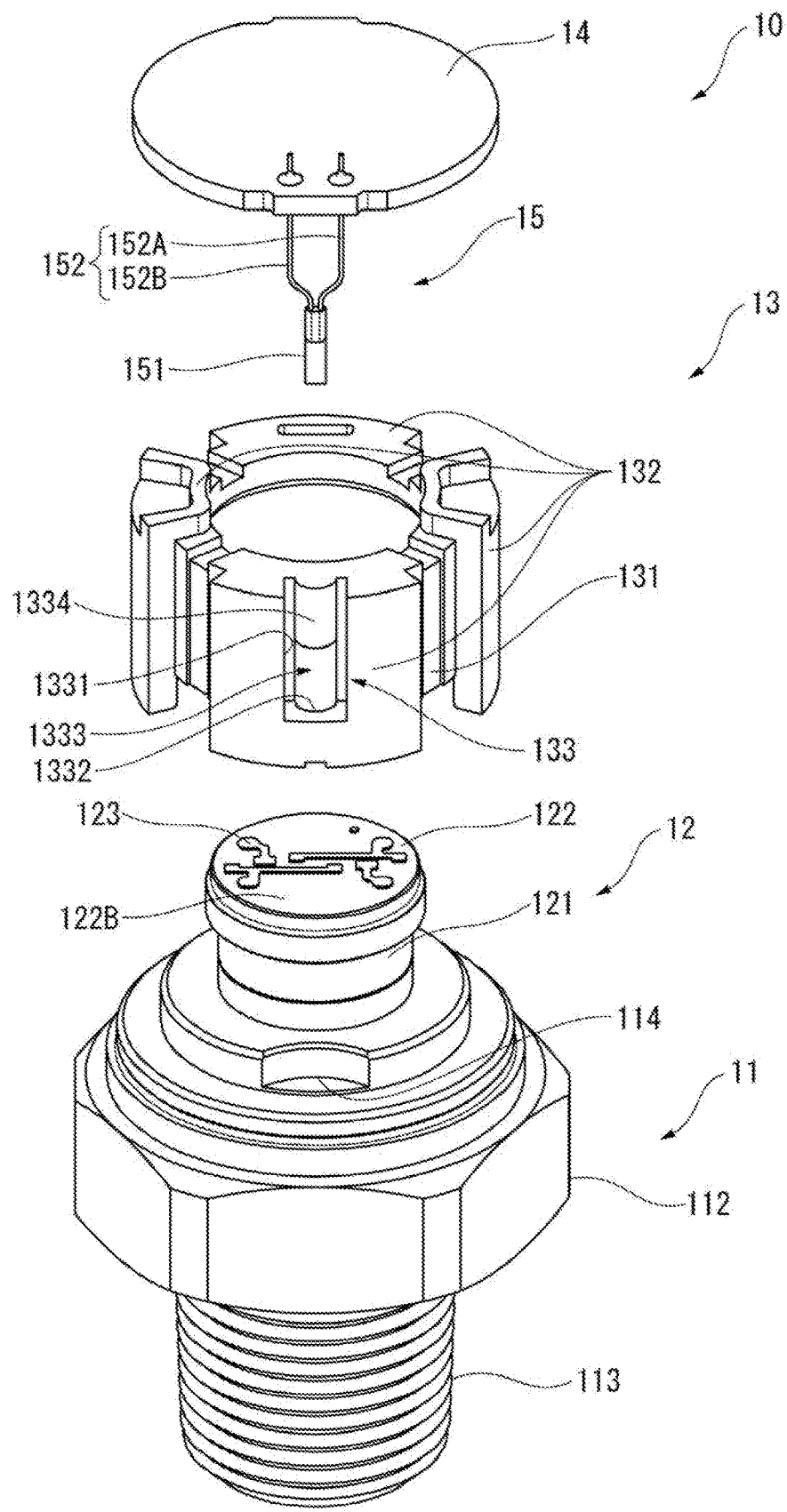
FIG. 4 is an exploded perspective view showing the overall structure of the sensor assembly according to the exemplary embodiment.
Figure 5:
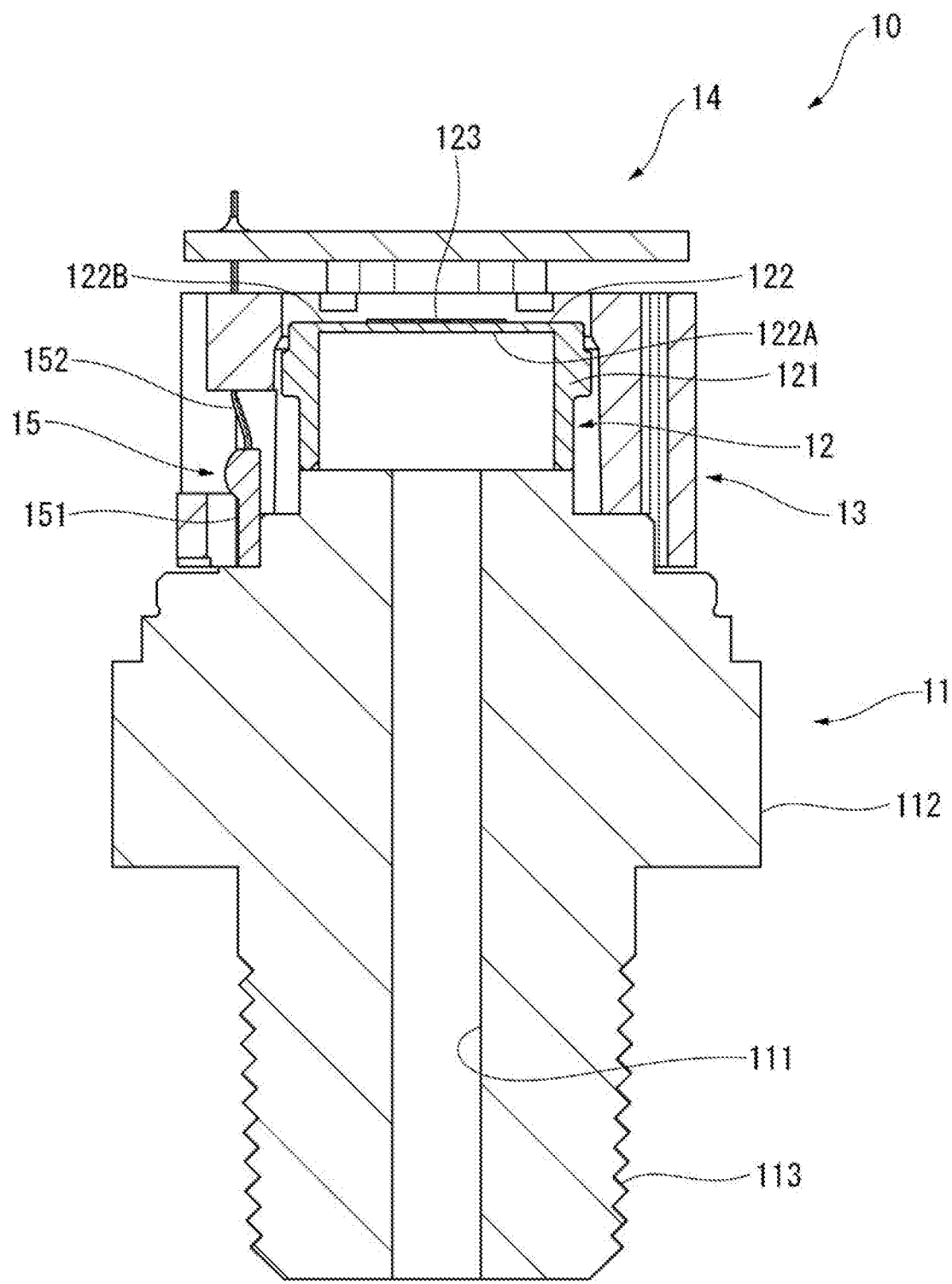
FIG. 5 is a cross-sectional view showing the overall structure of the sensor assembly taken along A-A line in FIG. 3.

FIG. 3 is a perspective view showing an overall structure of the sensor assembly 10. FIG. 4 is an exploded perspective view showing the overall structure of the sensor assembly 10. FIG. 5 is a cross-sectional view showing the overall structure of the sensor assembly 10 taken along A-A line in FIG. 3.

As shown in FIGS. 2 to 5, the sensor assembly 10, which includes a joint 11, a sensor module 12, a base member 13, the electronic circuit 14, and a temperature sensor 15, is attached to the cylindrical case 2.

Joint

The joint 11 is a metallic component that is attached to the cylindrical case 2 to cover the first opening 22 of the cylindrical case 2. In the exemplary embodiment, the joint 11 is welded to an end of the cylindrical case 2 provided with the first opening 22. It should be noted that the joint 11 is not necessarily welded with the cylindrical case 2. For instance, the joint 11 may alternatively be threaded with the cylindrical case 2.

The joint 11 includes a pressure introduction port 111 into which measurement target fluid is introduced. A first end of the joint 11 is defined as a tool engagement portion 112 radially extending from the center of the joint 11 and being engageable with a tool (e.g., a spanner). A second end of the joint 11 is defined as an external thread 113 to be screwed into an attachment target (not shown).

The joint 11 is further provided with a positioning recess 114, which is engageable with a later-described positioning projection 134 of the base member 13, at a position corresponding to the positioning projection 134.

It should be noted that the second end of the joint 11 is not necessarily in the form of the external thread 113 but may be in a form of an internal thread. Alternatively, the second end of the joint 11 may be configured to be welded to the attachment target.

Sensor Module

The sensor module 12 is a metallic component and includes a cylindrical portion 121, a diaphragm 122, and a detector 123.

The cylindrical portion 121 is attached to the first end of the joint 11. Further, the cylindrical portion 121, which is in communication with the pressure introduction port 111 of the joint 11, is configured to receive the measurement target fluid.

The diaphragm 122 is integrally provided to an end of the cylindrical portion 121. The diaphragm 122 includes a first surface 122A configured to be in contact with the measurement target fluid and a second surface 122B opposite the first surface 122A.

The detector 123 is provided on the second surface 122B of the diaphragm 122. In the exemplary embodiment, the detector 123, which is provided by a so-called strain gauge, is configured to detect the pressure of the measurement target fluid introduced in the cylindrical portion 121.

The sensor module 12 is not necessarily a metallic component, but may be, for instance, a ceramic component.

Base Member

Figure 6:
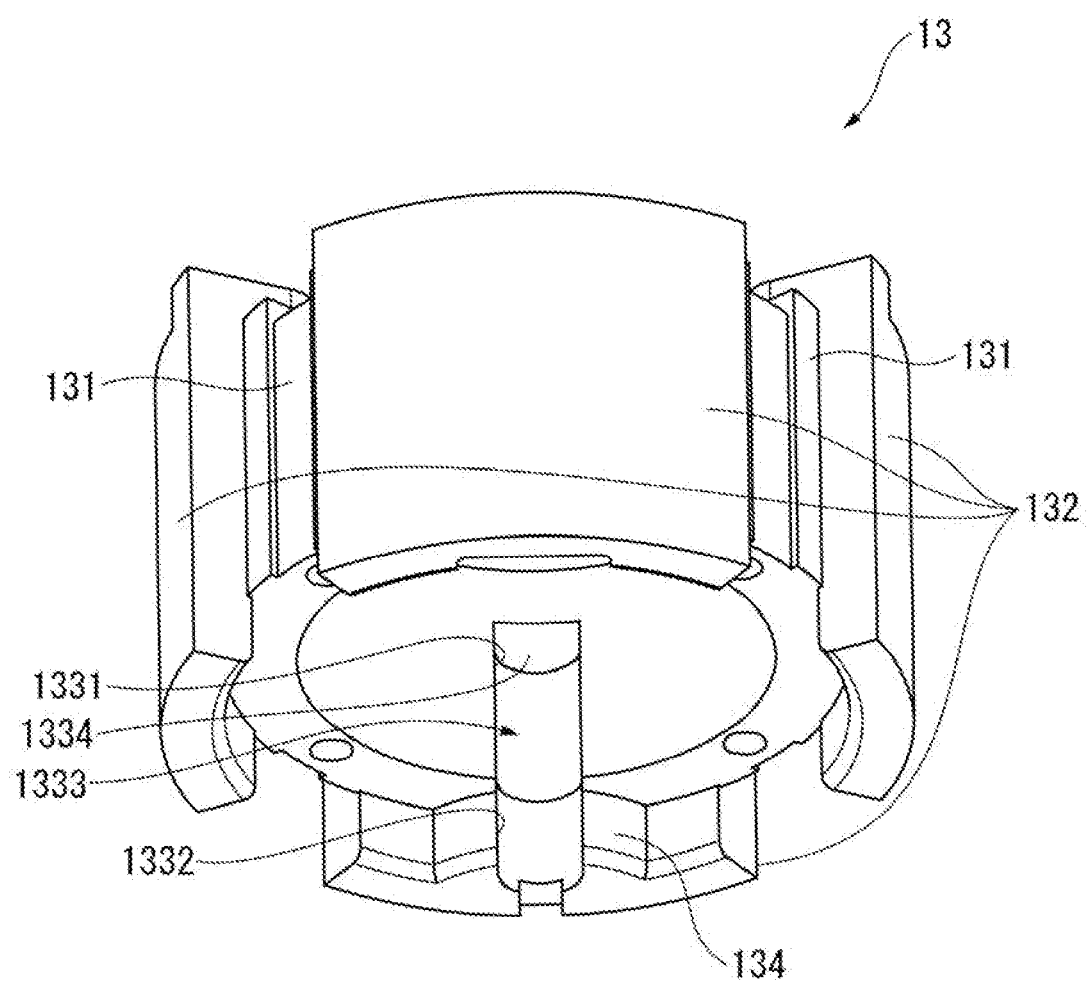
FIG. 6 is a perspective view showing an overall structure of a base member according to the exemplary embodiment.

FIG. 6 is a perspective view showing an overall structure of the base member 13.

As shown in FIGS. 3 to 6, the base member 13 is a synthetic-resin component including a base member body 131, a plate portion 132, and the positioning projection 134.

It should be noted that the base member 13 is not necessarily a synthetic-resin component but may be a metallic or ceramic component.

The base member body 131 is a circular cylindrical component that is disposed to surround the sensor module 12. It should be noted that the base member body 131 is not necessarily in a form of a circular cylinder, but may be in a form of a polygonal cylinder (e.g. quadrangular cylinder and hexagonal cylinder).

The plate portion 132 includes four plate portions projecting in four directions from a circumferential surface of the base member body 131. In the exemplary embodiment, each of the plate portions 132 is integrated with the base member body 131. As described later, the positioning projection 134 provided on an inner circumferential side of one of the four plate portions 132 determines the position of the base member 13 with respect to the joint 11 and the sensor module 12.

Further, one of the four plate portions 132 is provided with a receiver 133 for receiving a temperature detector 151 and a lead wire 152 of the temperature sensor 15, as described later. The receiver 133 will be described in detail later.

The positioning projection 134 is provided on an inner circumferential side of the plate portion 132 provided with the receiver 133 at a position corresponding to the positioning recess 114 of the joint 11. When the positioning projection 134 is engaged with the positioning recess 114 of the joint 11, the position of the base member 13 is determined with respect to the joint 11. In other words, the positioning projection 134 serves as a rotation stopper for keeping the base member 13 from rotating with respect to the joint 11.

Receiver

The receiver 133 is provided with a groove 1331, a receiver recess 1332, a communication hole 1333, and a projected guide 1334.

The groove 1331, which is formed on an outer circumferential side of the plate portion 132, is configured to receive the later-described lead wire 152 of the temperature sensor 15. The projected guide 1334 is provided in the middle of the groove 1331.

The receiver recess 1332 is provided on the inner circumferential side of the plate portion 132 (on the positioning projection 134). The receiver recess 1332 receives the later-described temperature detector 151 of the temperature sensor 15. In other words, the receiver 133 is configured to receive the temperature detector 151 and the lead wire 152 of the temperature sensor 15 in the groove 1331 and the receiver recess 1332.

The communication hole 1333 is provided at the groove 1331 in a manner to penetrate through the base member body 131 and the plate portion 132 from the inner circumferential side to the outer circumferential side thereof. Thus, the temperature sensor 15 can be disposed so that the temperature sensor 15 extends from the outer circumferential side to the inner circumferential side of the base member body 131 and the plate portion 132.

Electronic Circuit

The electronic circuit 14 is a disc-shaped plate member disposed at a first end of the base member 13 to cover the diaphragm 122 of the sensor module 12. The electronic circuit 14, which is provided thereon with wiring pattern and the like (not shown), is electrically connected with the temperature sensor 15. The electronic circuit 14 is also electrically connected with the sensor module 12 and the circuit board 4 via wires and the like (not shown). Thus, the detection signal received from the sensor module 12 and the temperature sensor 15 can be outputted to the circuit board 4.

The electronic circuit 14 is also configured to be electrically connected with an external device without the aid of the circuit board 4. Thus, the sensor assembly 10 by itself (i.e. the sensor assembly 10 before being installed in the physical quantity measuring device 1) can output the detection signal of the sensor module 12 and the temperature sensor 15 to the external device. Thus, the sensor assembly 10 can be stored after the temperature calibration and temperature characteristics of the sensor assembly 10 are checked using the external device.

Temperature Sensor

The temperature sensor 15 includes the temperature detector 151 and the lead wire 152.

The temperature detector 151, which is formed of a so-called resistance temperature detector, is received in the receiver recess 1332 on the inner circumferential side of the base member 13 (i.e. at a side close to the sensor module 12). Accordingly, the temperature detector 151 is provided at a side of the sensor module 12 without receiving the measurement target fluid (i.e. the side provided with the detector 123) and near the sensor module 12. Thus, when, for instance, the temperature of the measurement target fluid is high, the temperature detector 151, which is cooled by ambient air in the same manner as the detector 123, can accurately measure the temperature of the detector 123. It should be noted that the temperature detector 151 is not necessarily provided by a resistance temperature detector, but may be configured by any material and in any manner as long as the temperature is measurable.

The lead wire 152, which is a line electrically connecting the temperature detector 151 and the electronic circuit 14, includes a first lead wire 152A and a second lead wire 152B. The first lead wire 152A and the second lead wire 152B are mutually oppositely disposed in the groove 1331 of the receiver 133 across the projected guide 1334. The first lead wire 152A and the second lead wire 152B are thus kept from being in contact with each other, preventing short circuit even without applying any insulating treatment (e.g. coating).

Assembly Method of Sensor Assembly

Next, an assembly method of the sensor assembly 10 will be described below with reference to FIGS. 3 to 6.

Initially, the cylindrical portion 121 of the sensor module 12 is attached to the first end of the joint 11.

Next, the base member 13 is mounted to surround the sensor module 12 attached to the joint 11. At this time, the base member 13 is installed so that the positioning projection 134 is engaged with the positioning recess 114 of the joint 11. The position of the base member 13 with respect to the joint 11 is thus determined. It should be noted that the base member 13 is fixed to the joint 11 with an adhesive in the exemplary embodiment.

Then, the electronic circuit 14 connected with the temperature sensor 15 is placed on the first end of the base member 13. At this time, the electronic circuit 14 is placed so that the temperature detector 151 is received in the receiver recess 1332 and the first lead wire 152A and the second lead wire 152B are mutually oppositely disposed across the projected guide 1334.

Finally, the detector 123 of the sensor module 12 is electrically connected to the electronic circuit 14 with a wire and the like (not shown).

The following advantages can be obtained in the exemplary embodiment.

(1) In the exemplary embodiment, the temperature detector 151 of the temperature sensor 15 is received in the receiver 133 of the cylindrical base member 13 surrounding the sensor module 12 provided with the detector 123. Accordingly, the temperature detector 151 can be provided at the side of the sensor module 12 opposite the side receiving the measurement target fluid (i.e. the side provided with the detector 123) and near the sensor module 12. Thus, even when, for instance, the temperature of the measurement target fluid is high, the temperature detector 151, which is cooled by the ambient air in the same manner as the detector 123, can accurately measure the temperature of the detector 123. Therefore, appropriate temperature calibration can be performed on the pressure of the measurement target fluid detected by the detector 123.

Further, since the temperature detector 151 and the lead wire 152 can be received in the receiver 133 of the base member 13, it is not necessary to provide in the joint 11 the receiver for receiving the temperature detector 151 and the lead wire 152, so that the production process for the joint 11 can be facilitated. It should be noted that the base member 13 in the exemplary embodiment is made of, for instance, a synthetic resin, the receiver 133 for receiving the temperature detector 151 and the lead wire 152 can be easily formed.

(2) In the exemplary embodiment, when the base member 13 is assembled with the joint 11, the positioning recess 114 of the joint 11 is engaged with the positioning projection 134 of the base member 13, thereby determining the position of the base member 13 with respect to the joint 11. Accordingly, no positioning device or the like is necessary in assembling the base member 13 and the joint 11, so that the production of the sensor assembly 10 can be facilitated.

(3) In the exemplary embodiment, the receiver recess 1332 for receiving the temperature detector 151 is provided on the inner circumferential side of the base member 13. Accordingly, the temperature detector 151 can be provided near the sensor module 12. The accurate temperature of the sensor module 12 can thus be measured. Further, since the receiver recess 1332 is provided on the positioning projection 134, it is not necessary to separately form the positioning projection 134 and the receiver recess 1332, thus facilitating the production of the base member 13.

(4) In the exemplary embodiment, the first lead wire 152A and the second lead wire 152B are mutually oppositely disposed across the projected guide 1334, preventing the short circuit between the first lead wire 152A and the second lead wire 152B. Accordingly, no insulating treatment is necessary for these wires, thereby facilitating the production of the sensor assembly 10.

(5) In the exemplary embodiment, the sensor assembly 10 by itself includes the sensor module 12, the temperature sensor 15 and the electronic circuit 14. Accordingly, the temperature calibration and the temperature characteristics of the sensor module 12 can be checked before the sensor assembly 10 is installed in the physical quantity measuring device 1. Thus, the sensor assembly 10 can be stored after the temperature calibration and temperature characteristics of the sensor module 12 are checked, thereby enhancing the production efficiency of the physical quantity measuring device 1.

Modification(s)

It should be understood that the scope of the invention is not limited to the above-described exemplary embodiment but includes modifications and improvements as long as the modifications and improvements are compatible with an object of the invention.

Though a single temperature sensor 15 is provided in the exemplary embodiment, such an arrangement is not limiting. For instance, a plurality of temperature sensors 15 are provided in some embodiments. In this case, a plurality of receivers 133 corresponding to the respective temperature sensors 15 are optionally provided on the base member 13.

Though the receiver recess 1332 of the base member 13 is provided on the positioning projection 134 in the exemplary embodiment, such an arrangement is not limiting. For instance, the receiver recess 1332 and the positioning projection 134 are separately provided in some embodiments. Furthermore, the invention encompasses a sensor assembly without including the positioning projection 134. In this case, the positioning recess 114 is not necessarily provided in the joint 11.

Though the projected guide 1334 is provided in the groove 1331 of the base member 13 in the exemplary embodiment, such an arrangement is not limiting. For instance, guide grooves each for corresponding one of the first lead wire 152A and the second lead wire 152B are provided in some embodiments.

Though the base member 13 includes four plate portions 132 projecting in four directions from the circumferential surface of the base member body 131 and one of the plate portions 132 is provided with the receiver 133 in the exemplary embodiment, such an arrangement is not limiting. For instance, a single plate portion 132 is provided, or four or more plate portions 132 are provided in some embodiments. Furthermore, the invention encompasses a sensor assembly without including the plate portion 132 on the base member body 131. In this case, the receiver 133 is optionally provided in the base member body 131.

Though the temperature detector 151 of the temperature sensor 15 is provided near the sensor module 12 in the exemplary embodiment, such an arrangement is not limiting. For instance, the temperature detector 151 is in contact with a side surface of the joint 11 or a side surface of the cylindrical portion 121 of the sensor module 12 in some embodiments. Further, the invention encompasses an arrangement in which the temperature detector 151 is slightly spaced from the joint 11 and the sensor module 12.

Though the cylindrical case 2, the joint 11, and the cap 3 in the exemplary embodiment are metallic components, such an arrangement is not limiting. For instance, at least one of the cylindrical case 2, the joint 11, and the cap 3 is made of a synthetic resin in some embodiments of the invention.

In the above exemplary embodiment, though the physical quantity measuring device 1 is configured to measure the pressure of the measurement target fluid, such an arrangement is not limiting. For instance, a differential pressure is measured in some embodiments.

What is claimed is:

1. A sensor assembly comprising:
a sensor module comprising: a cylindrical portion, in which a measurement target fluid is introducible; and a diaphragm provided at an end of the cylindrical portion, the diaphragm comprising a first surface to be in contact with the measurement target fluid, and a second surface opposite the first surface, a detector being provided on the second surface;
a joint attached with the sensor module, the joint comprising a pressure introduction port configured to introduce the measurement target fluid to the sensor module;
a cylindrical base member attached to the joint, the cylindrical base member surrounding the sensor module;
an electronic circuit attached to the base member and configured to receive a detection signal outputted by the detector; and
a temperature sensor electrically connected with the electronic circuit, wherein
the temperature sensor comprises a temperature detector configured to detect a temperature, and at least one lead wire electrically connecting the temperature detector and the electronic circuit,
the base member is provided with a receiver configured to receive the temperature detector and the lead wire, and
the receiver comprises: a groove formed on an outer circumferential side of the base member and configured to receive the lead wire; a receiver recess formed on an inner circumferential side of the base member and configured to receive the temperature detector; and a communication hole for bringing the groove in communication with the receiver recess.

2. The sensor assembly according to claim 1, wherein
the base member comprises a positioning projection on an inner circumferential side thereof, and
the joint comprises a positioning recess engageable with the positioning projection at a position corresponding to the positioning projection.

3. The sensor assembly according to claim 2, wherein the receiver recess is formed on the positioning projection.

4. The sensor assembly according to claim 3, wherein
the at least one lead wire comprises a first lead wire and a second lead wire, and
the groove comprises a projected guide between the first lead wire and the second lead wire.

5. A physical quantity measuring device comprising:
the sensor assembly according to claim 1;
a cylindrical case attached with the sensor assembly; and
a signal transmitting member electrically connected with the electronic circuit.

* * * * *